INVENTORS
WERNER GEY
WOLFGANG PHILIPP
EWALD DITTRICH
HORST CORSEPIUS
BY PETER BONDERS

McCarthy, Depaoli & O'Brien
ATTORNEYS

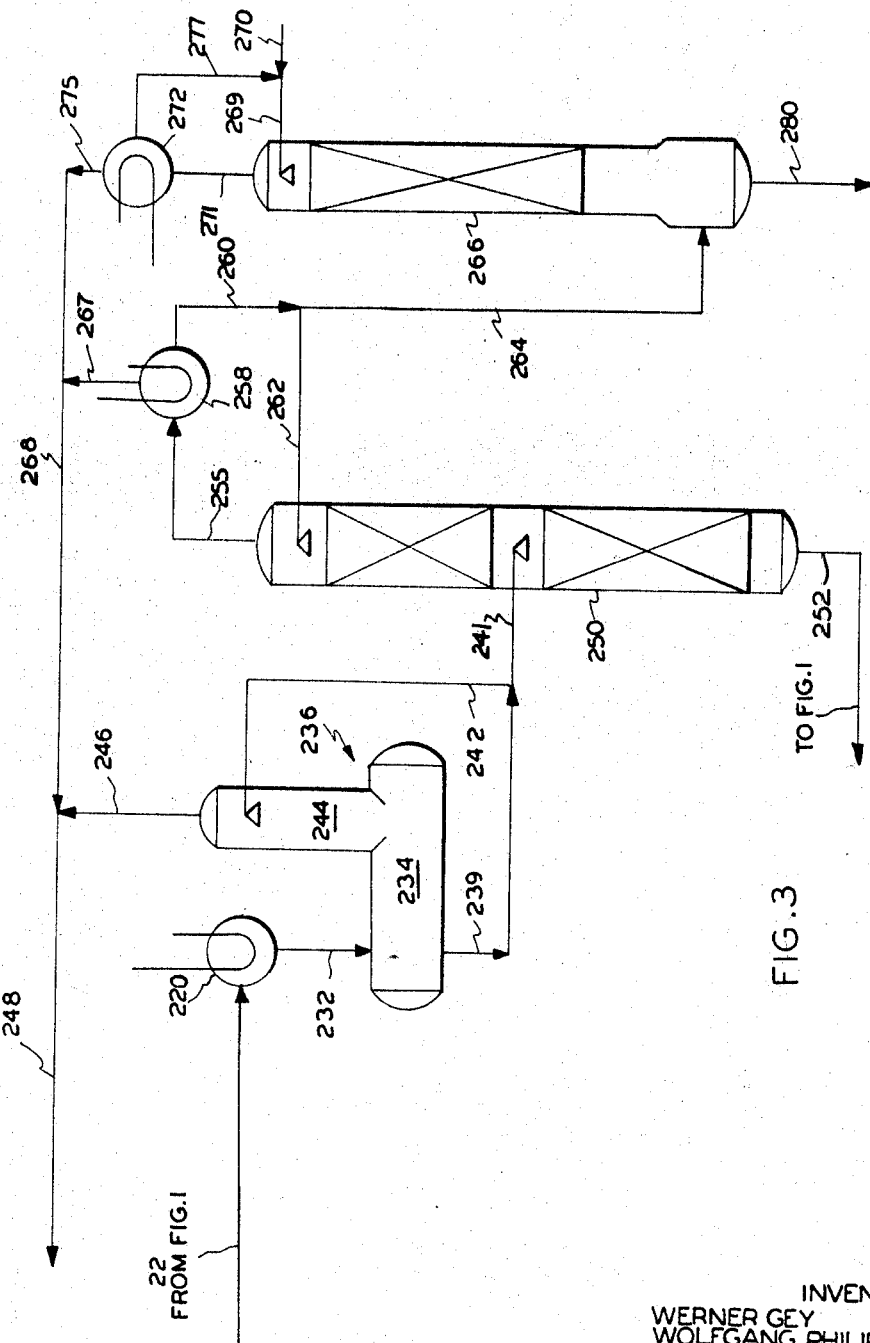

United States Patent Office 3,451,900
Patented June 24, 1969

3,451,900
ADIPONITRILE RECOVERY BY MULTISTAGE VACUUM DISTILLATION
Werner Gey, Offenbach, Wolfgang Philipp, Dornigheim, Ewald Dittrich, Grosskrotzenburg, Horst Corsepius, Frankfurt, and Peter Bonders, Offenbach, Germany, assignors to Vickers-Zimmer Aktiengesellschaft Planung und Bau von Industrieanlagen, a corporation of Germany
Filed June 14, 1966, Ser. No. 557,429
Int. Cl. C07c 121/26; B01d 3/10, 3/40
U.S. Cl. 203—75                    9 Claims

ABSTRACT OF THE DISCLOSURE

There is disclosed a method for the production of pure adiponitrile from a reaction product containing adiponitrile, cyclopentanone, 2-cyan-cyclopenten-(1)-yl-amine and other components higher boiling than adiponitrile wherein cyclopentanone and 2-cyan-cyclopenten-(1)-yl-amine are distilled from the adiponitrile, the improvement which comprises subjecting the reaction product to a distillation for separation into a distillate comprising adiponitrile and all lower boiling components and a residue comprising components higher boiling than adiponitrile, and thereafter submitting said distillate to a multistage vacuum distillation process for separating the lower boiling impurities from the adiponitrile.

---

Figure 1:
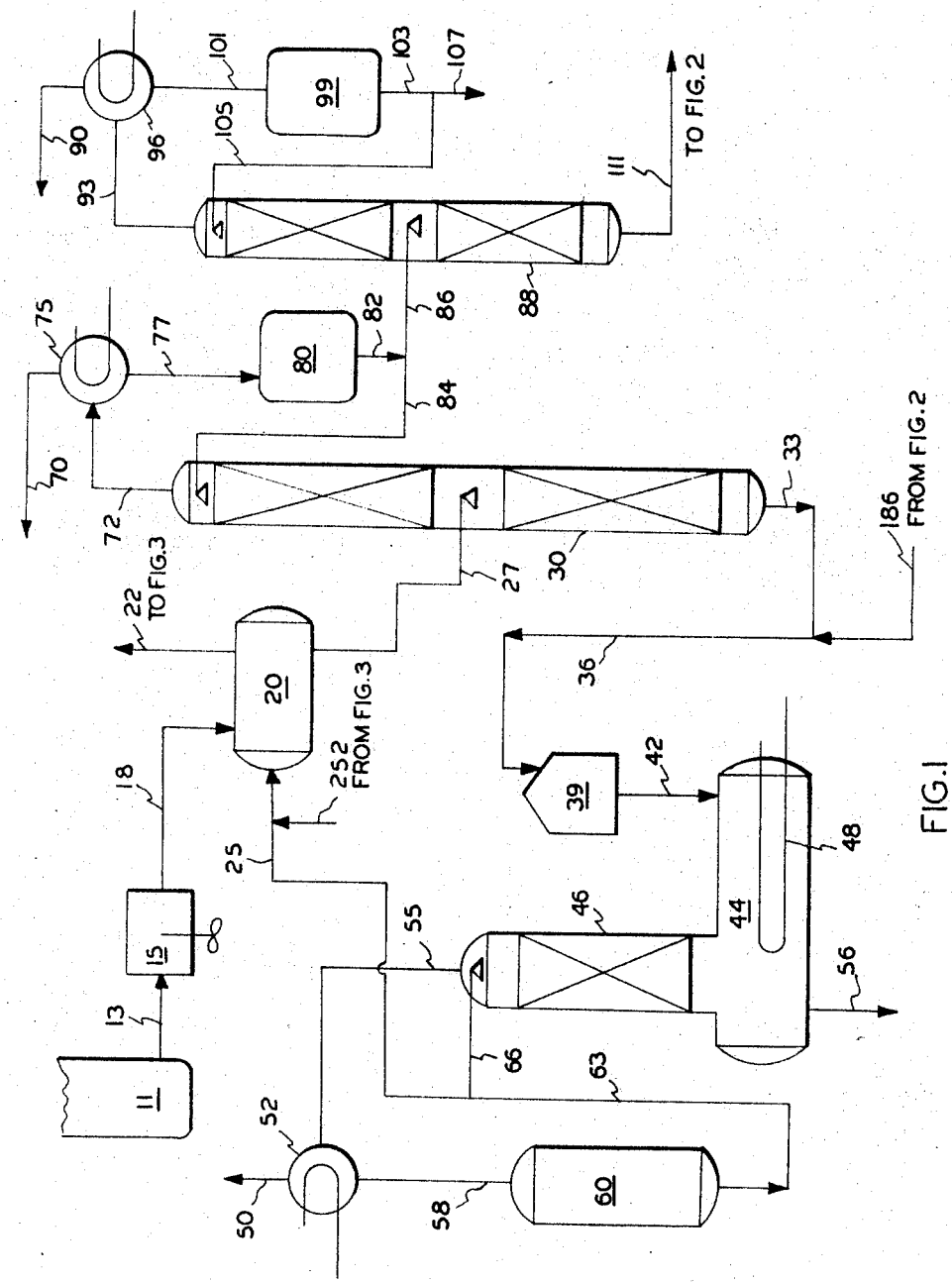

The present invention relates, in general, to the purification of aliphatic dinitriles and, in particular, to purification procedures for the recovery of adiponitrile of sufficient purity suitable for use in the manufacture of a polyamide.

Adiponitrile, conventionally produced by the reaction of adipic acid and ammonia in the presence of certain dehydration catalysts, normally contains a number of impurities in the reaction product such as ammonia, carbon dioxide, water, cyclopentanone and 2-cyano-cyclopenten-(1)-yl-amine which must be removed in order to provide adiponitrile of sufficient purity to permit its use, subsequently, in the manufacture of a polyamide after its conversion to the corresponding diamine.

Heretofore customary procedures for the purification of adiponitrile usually involved one or more chemical treatment steps for the removal of one or more of the aforesaid impurities. In one conventional process, it is possible, for example, to purify nitriles, containing oxidizable impurities, by nitric acid treatment and subsequent distillation (German Patent 1,150,062) but this process requires a fairly thorough prepurification of the raw adiponitrile by means of distillation and a thorough subsequent washing of the thus treated adiponitrile. This procedure also puts a great strain on the material used for the equipment, due to nitric acid-induced corrosion.

In other conventional processes, adiponitrile is purified by a treatment with various acids (German Patents 901,887 and 926,070). In these processes, also, the corrosion of the process equipment is considerable. Moreover, the nitrile groups of the adiponitrile become amidified, particularly if strong acids are used. Mineral acids present in the adipic acid may act as catalyst poisons in later processing. If weak acids are used, the adiponitrile is not sufficiently purified. If the acids are neutralized by ammonia and the adiponitrile is subsequently washed with water (German Patent 921,937), a partial saponification of the nitrile groups of the adiponitrile takes place too, regardless of the comprehensive distillation equipment required for the separation of water from the adiponitrile.

It is further known that impurities containing imino or oxo groups can be converted by means of hydrazines into the corresponding higher boiling hydrazones as exemplified by the processes described in British Patent 773,014. In yet another conventional process, impurities containing amino, imino or hydroxy groups are reacted with phenyl-isocyanate to give ureas or urethanes as represented by German Patent 927,089. During subsequent distillation, the conversion products decompose, particularly at higher temperatures, thus contaminating the distillation product. Moreover, the agents to be added are fairly expensive and difficult to handle.

In another process, the adiponitrile, prepurified by distillation, is treated with potassium permangate and, after the stripping of the solid substances, subjected to fractional distillation (German Patent 1,023,754 and U.S. 2,305,103). In such processes comparatively numerous processing steps are required to separate the solid substances and to remove traces of diluted alkali since, during the subsequent distillation, by-products, formed, even at quite moderate temperatures, contaminate the distillation product considerably. A process wherein the raw anhydrous nitriles are treated with anhydrous bisulfate prior to distillation processes the same disadvantage as those described above, i.e. in spite of application of numerous auxiliaries and the necessary equipment, intensive distillation is still required to remove minor portions of by-products, that is, about 0.05–0.1%.

Accordingly, it is an object of this invention to provide a method for the purification of an adiponitrile product which does not involve the use of chemical treatment steps for the removal of impurities.

In accordance with the invention, means have been devised for the production of an adiponitrile product of high purity from a reaction mixture containing cyclopentanone, 2-cyan-cylopenten-(1)-yl-amine and other components higher boiling than adiponitrile in a multistage distillation procedure wherein the first step of said multistage distillation process is the separation of components higher boiling than adiponitrile and in which the adiponitrile at any stage in the multistage distillation process is not subjected to temperatures greater than 195° C. Thus, in essence then, the present invention is based, at least in part, upon the discovery that adiponitrile, of high purity, can be recovered from an organic phase, obtained by the reaction of adipic acid and ammonia and containing adiponitrile, cyclopentanone, 2-cyan-cyclopenten-(1)-yl-amine and other organic components higher boiling than adiponitrile by separating, by distillation, an adiponitrile fraction from other organic components higher boiling than adiponitrile prior to separation, by distillation of cyclopentanone and 2-cyano-cyclopenten-(1)-yl-amine therefrom and controlling and maintaining the adiponitrile temperature in all of the distillation separations at a temperature not greater than 195° C.

In particular, it has been found that adiponitrile, of high purity, can be obtained from an organic phase obtained by the reaction of adipic acid and ammonia and containing cyclopentanone, 2-cyano-cyclopenten-(1)-yl-amine and other organic components higher boiling than adiponitrile which comprises introducing said organic phase into a first vacuum distillation zone maintained at reduced pressures sufficient to provide a bottoms temperature of not greater than 195° C. and fractionally distilling the same to produce a first overhead fraction containing adiponitrile, cyclopentanone and 2-cyan-cyclopenten-(1)-yl-amine and a first bottoms product comprising other organic components higher boiling than adiponitrile, withdrawing said first overhead product from said first distillation zone and introducing the same into a second distillation zone maintained at reduced pressures sufficient to provide a bottoms temperature of not greater than 195° C. and fractionally distilling the same to produce a second overhead fraction containing a cyclopentanone-water azeotrope and a second bottoms product, withdrawing said second bottoms product from said second distillation zone and introducing the same into at least a third distillation zone maintained at reduced pressures sufficient to provide a bottoms temperature of not greater than 195° C. and fractionally distilling the same to produce a third overhead product containing substantially all of the 2-cyan-cyclopenten-(1)-yl-amine and withdrawing as a bottoms product adiponitrile of high purity.

In another embodiment of the invention an adiponitrile product of high purity is obtained from the vaporous reaction product of adipic acid and ammonia by a method which comprises condensing said vaporous reaction product, introducing the same into a separation zone to provide an inorganic phase containing water and ammonium carbonate and an organic phase containing adiponitrile, cyclopentanone, 2-cyan-cyclopenten-(1)-yl-amine and other organic components higher boiling than adiponitrile, separating said inorganic and organic phases, introducing said organic phase into a first vacuum distillation zone maintained at reduced pressures sufficient to provide a bottoms temperature therein of not greater than 195° C., distilling said organic phase to produce a first vaporous overhead fraction containing adiponitrile, cyclopentanone and 2-cyan-cyclopenten-(1)-yl-amine and a first liquid bottoms product comprising other organic components higher boiling than adiponitrile, withdrawing said first bottoms product and introducing the same into a second vacuum distillation zone maintained at reduced pressures sufficient to provide a bottoms temperature therein of not greater than 195° C., and fractionally distilling the same to produce an overhead product containing adiponitrile and recycling a portion of the same to said first vacuum distillation zone, withdrawing said first vaporous overhead product from said first distillation zone, condensing the same, recycling a portion thereof as reflux to said first distillation zone while introducing the remainder thereof into a second distillation zone maintained at a reduced pressure sufficient to provide a bottoms temperature of not greater than 195° C. and fractionally distilling the same to produce a second vaporous overhead fraction containing a cyclopentanone-water azeotrope, and a second liquid bottoms product containing adiponitrile and 2-cyan-cyclopenten-(1)-yl-amine withdrawing said second vaporous overhead product from said second distillation zone, condensing the same and recycling a portion thereof as reflux to said second distillation zone, withdrawing said second liquid bottoms product from said second distillation zone, introducing the same into a third distillation zone maintained at reduced pressure sufficient to provide a bottoms temperature of not greater than 195° C. and fractionally distilling the same to produce a third vaporous overhead fraction containing substantially all of the 2-cyan-cyclopenten-(1)-yl-amine and withdrawing, as a liquid bottoms product, adiponitrile of high purity.

In one of the preferred embodiments of the invention the liquid bottoms product comprising adiponitrile, free of cyclopentanone and 2-cyan-cyclopenten-(1)-yl-amine, is subjected to further purification procedures and, if desired, said liquid bottoms product from the third distillation zone is introduced into the upper end of a fourth distillation zone maintained at reduced pressures sufficient to provide a bottoms temperature therein of not greater than 195° C. The vaporous overhead fraction from the fourth distillation zone is condensed in the usual manner and recycled as bottoms product to the third distillation zone. The bottoms product from the fourth distillation zone is then introduced into a final refining zone and substantially pure adiponitrile is distilled overhead while the bottoms product containing some adiponitrile is combined with the bottoms product from the first distillation zone for additional processing to recover additional quantities of adiponitrile. If desired, a portion of the overhead adiponitrile product from the final refining zone can be returned as reflux or sent to storage.

Ordinarily, the raw adiponitrile-containing mixture will contain inorganic impurities such as water, ammonia and carbon dioxide as ammonium carbonate. These are advantageously removed by distillation before separation of the organic materials is undertaken. The primarily inorganic fraction may be treated to recover ammonia, for example, for recycle to adiponitrile manufacture or for hexamethylenediamine manufacture and then the remaining inorganic material may be treated for adiponitrile recovery, if desired.

Most of the separation procedures employed in carrying out this invention involve fractional distillations, often at reduced pressures to prevent decomposition of the adiponitrile or the further production of undesired by products. Preferably, the fractional distillations are carried out in distillation columns maintained such that a low pressure drop occurs through the column e.g. spray towers.

The procedures of the invention provide a distinct advantage in that adiponitrile is obtained containing less than about 0.02% impurities. Still another advantage inherent in the procedures of the invention is that the efficiency of the hydrogenation catalysts in the subsequent hydrogenation of adiponitrile to hexamethyldiamine is in no way affected and the product obtained is most suitable for the production of polyamides. Yet another advantage of the process of the present invention for the production of pure adiponitrile is that no auxiliary chemicals are needed and the rather extensive equipment used in conventional chemical treatment processes is therefore unnecessary.

Figure 2:
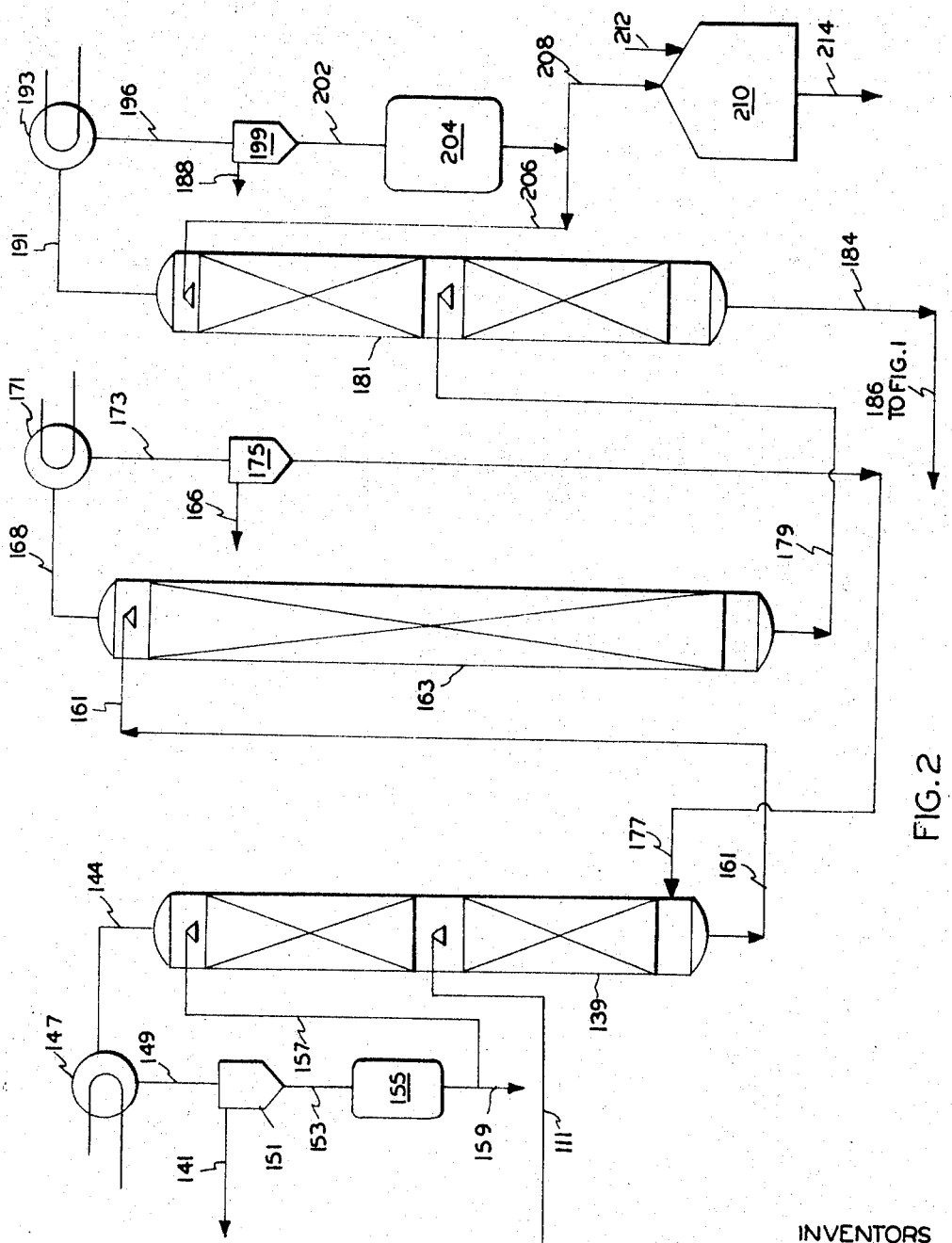

The invention will be better understood by reference to the accompanying drawings, FIGURES 1, 2, and 3 of which are schematic diagrams of apparatus which may be used in practicing the present invention.

In the drawings 11 represents a reactor in which adiponitrile is produced. The vaporous reaction product mixture leaves reactor 11 by line 13 to cooler 15. Instead of the single vent cooler shown, this may comprise a series of cooling stages. The reaction product mixture is drawn off by line 18 to hot separator 20 where the adiponitrile and other organic materials, by now condensed, pass to the bottom of the separator while inorganics, in the vapor form, gather at the top of the separator 20 and are removed by line 22. The separator also receives, by line 25, adiponitrile-containing bottoms from later recovery units.

Line 27 conducts the condensed organic fraction from separator 20 to the stripping column 30. As can be seen, the liquid is brought to a mid-section of the column which advantageously is packed with Rieselblech packing. This packing material is a honeycomb structure with perpendicularly arranged walls made of grid metal. Heavy ends, leaving this column by line 33 generally contain enough adiponitrile to warrant recovery. Thus, this liquid is brought by line 36 to the surge tank 39 along with a bottoms product from a later stage of the process which contains some adiponitrile.

The surge tank 39 passes its contents by line 42 to the tank 44 associated with batch column 46. This tank 44 is provided with heating coil 48. The top of the column 46 is provided with a reduced pressure by a vacuum source operating through line 50, condenser 52 and overhead line 55. The bottoms from tank 44 is sent by line 56 to waste. The overhead passes through line 55 and is cooled in condenser 52 before passing through line 58 to tank 60. A portion of this product is sent back by lines 63 and 66 to the batch column 46 as reflux, while the remainder comprising adiponitrile, freed of most higher boiling impurities, is sent by line 25 back to the hot separator 20.

A reduced pressure is maintained in column 30 by access of line 70 to a vacuum source. Overhead from the stripper 30 passes out by line 72 and is cooled in the condenser 75. The condensate passes by line 77 to the receiving tank 80. A portion of the condensate passes by lines 82 and 84 back to the stripper 30 as reflux while the remainder passes by line 86 to cyclopentanone removal column 88, which forms the first stage of the multistage distillation means. The liquid mixture is introduced to the mid-section of this column which usually is provided with bubble-cap trays. The top of this column is exposed to a vacuum source by line 90. Overhead from this column as an azeotropic mixture of cyclopentanone and water, leaves by line 93, and is condensed in condenser 96 to produce liquid which passes to tank 99 by line 101. About half the azeotropic mixture can be and is, if desired, returned by lines 103 and 105 to the column 88 as reflux while the balance is removed from the system by line 107.

The bottoms from column 88, containing most of the adiponitrile, now essentially free of both high-boilers and cyclopenantone, pass by line 111 to the central portion of 2-cyano-cyclopenten-(1)-yl-amine removal of column 139 (see FIGURE 2). This column also is supplied with Rieselblech packing. Its top has access to a vacuum source by line 141. Overhead passes by line 144 to condenser 147 to give liquid which passes through line 149, vessel 151 and line 153 to tank 155. From this tank the major amount of condensate containing the 2-cyancyclopenten-(1)-yl-amine is passed by line 157 back to column 139 as reflux, but a portion is sent to waste by line 159.

Bottoms from column 139 are removed by line 161 and passed to the top of column 163. This column also is supplied with Riselblech packing. The top of this column is subjected to reduced pressure due to a vacuum source acting through the line 166.

Overhead passes from the column 163 by line 168 to condenser 171 and to line 173, vessel 175 and line 177 and back to the bottom of column 139.

The bottoms fraction from column 163, which comprises adiponitrile, free of 2-cyan-cyclopenten-(1)-yl-amine passes by line 179 to the adiponitrile column 181. This column also has Riselblech packing and the bottoms enter at the mid-section of the column. A bottoms product containing some adiponitrile is withdrawn by line 184 and sent by lines 186 and 36, to the surge tank 39. The top of adiponitrile column 181 is held at reduced pressure by access of line 188 to a vacuum source. Overhead, comprising almost pure adiponitrile passes by line 191 to condenser 193 which provides liquid to line 196, vessel 199 and line 202. Adiponitrile product collects in tank 204. The major portion of this product is sent back by line 206 to column 181 as reflux while the rest is passed by line 208 to adiponitrile product storage tank 210. During storage the product may be blanketed with nitrogen or other inert gas from line 212. The product may be conducted to use or further conversion by line 214.

Overhead from the hot separator 20, consisting mainly of water, adiponitrile, ammonia, cyclopentanone and ammonium carbonate is taken by line 22 to cooler 220 (see FIG. 3) where these components are partially condensed and the effluent stream flows by line 232 to the tank portion 234 of cold separator 236. Here the liquid effluent is collected and conducted away by line 239. A portion of this liquid is sent by line 242 as a wash stream for the vapor, mostly ammonia, passing through column 244 to exit 246. This vapor sent by line 248 back to the adiponitrile forming reaction or elsewhere.

The aqueous liquid effluent from line 239, containing free dissolved ammonia, ammonium carbonate, cyclopentanone and a small amount of adiponitrile is sent to the mid-portion of column 250 by line 211. Bottoms from this column comprising mostly adiponitrile, is sent by line 252 to line 25 and hot separator 20.

The overhead from column 250 passes by line 255 to condenser 258 and the liquified effluent passes out by line 260. A portion of the condensate is returned by line 262 to column 250 as reflux while another portion passes by line 264 to the bottom of column 266. The noncondensed portion leaves the condenser 258 by line 267 and returns to the adiponitrile forming reaction by lines 268 and 248 of the overhead stream from column 250. The condensate from 272 is recycled by lines 277 and 269 together with aqueous caustic solution, introduced via line 270, to the column 266. The bottoms of column 266 is taken to waste by line 280. The overhead from column 266 is taken via line 271 through condenser 278 and the uncondensed ammonia, with substantially all of the water removed therefrom is taken via line 275 for reuse in the reaction system.

The following example will serve to illustrate the process of this invention and is to be considered illustrative only and not in any way as a limitation thereof.

EXAMPLE 1

A reactor produces adiponitrile at a temperature of about 350° C. and a pressure of 1.5 atmospheres. The product mixture contains adiponitrile mixed with ammonia, water, cyclopentanone (CP), 2-cyan-cyclopenten-(1)-yl-amine (CCPA), other high boiling by-products as well as carbon dioxide. The mixture is cooled to 120° C. which is sufficient to condense all but a trace of the organic materials.

Seven and six tenths (7.6) gallons per minute of this organic mixture is brought to a first distillation column held at a pressure of 15 mm./Hg. The bottom of this stripping column is at 180° C. while the top is at 60° C.

Six tenths (0.6) gallon per minute of bottoms are removed from this column and collected together with 0.1 gallon per minute from the bottom of the final distillation column. Intermittently, this bottoms fraction are passed to a vaporization tank held at 180° C. and 15 mm./Hg. The non-vaporized portion is sent to waste while the vapors, cooled to 150° C. for condensation are returned to the first distillation column.

Overhead from this distillation column is condensed to give 22.2 gallons per minute of organic liquid at 50° C., 15.2 gallons per minute of which is sent back to the distillation column as reflux. The other 7.0 gallons per minute passes to a CP fraction distillation column held at a temperature of 55° C. and 150 mm./Hg. Overhead from this column, comprising mostly an azeotropic mixture of cyclopentanone and water is cooled to about 55° C. About 0.1 gallon per minute of this condensate is sent to waste.

The CP column bottoms of 6.9 gallons per minute pass at about 170° C. to the CCPA column.

This column actually comprises two portions, but since the bottoms of the first portion are fed to the top of the second portion and since the overhead from the second portion after condensation is passed to the bottom of the first portion, it may be considered as a single column having a temperature of 160° C. and a pressure of 15 mm./Hg at its top and 180° C. at its bottom. 0.3 gallon per minute of overhead is sent to waste while 6.6 gallons per minute of adiponitrile, free 2-cyan-cyclopenten-(1)-yl-amine, is withdrawn from the bottom and passed to a further distillation. The top of this final distillation column is at 160° C. and 15 mm./Hg the overhead of which, when condensed at 150° C., provides 6.5 gallons per minute of adiponitrile product having a purity of 99.98%. The bottoms of the adiponitrile column, at 180° C. and 24 mm./Hg produces 0.1 gallon per minute of a bottoms product which is sent to a prior stage of the system for recovery of adiponitrile therefrom as already mentioned before.

The inorganic phase is treated for adiponitrile and ammonia recovery by lowering its temperature to about 50° C. to condense the aqueous portions. The uncondensed ammonia is recovered and the aqueous effluent is treated, by distilling off the water and other volatiles, for recovery of adiponitrile. The overhead is condensed and then passed to a further distillation column wherein it is treated with a 50% caustic soda solution. This distillation column, with a pressure of 1.5 atmospheres has an overhead temperature of 70° C. and a bottom temperature of 110° C. Ammonia and water leave overhead and the water is condensed out and sent to waste, leaving ammonia for reuse in the adiponitrile manufacture. The bottoms from this column, comprising water, sodium carbonate and caustic, are sent to waste.

What is claimed is:

1. In a method for the production of pure adiponitrile from a reaction product containing adiponitrile, cyclopentanone, 2-cyan-cyclopenten-(1)-yl-amine and other components higher boiling than adiponitrile wherein cyclopentanone and 2-cyan-cyclopenten-(1)-yl-amine are vacuum distilled from the adiponitrile, the improvement which comprises subjecting the reaction product to a distillation for separation into a distillate comprising adiponitrile and all lower boiling components and a residue comprising components higher boiling than adiponitrile and thereafter submitting said distillate to a multistage vacuum distillation process for separating the lower boiling impurities from the adiponitrile.

2. A method according to claim 1 wherein said multistage vacuum distillation includes removing bottoms from each of said stages and recovering adiponitrile from said removed bottoms in a final distillation zone.

3. A method according to claim 2 wherein in a first stage distillation of the multistage vacuum distillation, cyclopentanone is distilled in the presence of water as an azeotropic mixture.

4. A method according to claim 2 wherein adiponitrile is recovered from the bottoms of said multistage distillation as the overhead product of a final vacuum distillation stage.

5. A method according to claim 4 wherein the bottoms of said final distillation are conducted to a batch distillation and the overhead adiponitrile from said batch distillation is fed to the first stage distillation.

6. In a process for the recovery of pure adiponitrile from a reaction product containing adiponitrile, water, ammonia, ammonium carbonate, cyclopentanone, 2-cyan-cyclopenten-(1)-yl-amine and other organic components higher boiling than adiponitrile, the steps comprising subjecting said reaction product to heat whereby inorganic components of the reaction product are removed as a vapor mixture, subjecting the resulting organic component mixture to distillation for separation into a distillate comprising adiponitrile and all lower boiling components and a residue comprising components higher boiling than adiponitrile, and thereafter submitting the said distillate to a multistage vacuum distillation process for separating the lower boiling impurities from the adiponitrile.

7. A process according to claim 6 wherein the inorganic vapor mixture is treated for recovery of ammonia.

8. A process according to claim 7 wherein the inorganic mixture, after treatment for recovery of ammonia, is again subjected to heat for recovery of adiponitrile therefrom.

9. The method of recovering adiponitrile of high purity from an organic phase obtained by the reaction of adipic acid and ammonia and containing adiponitrile, cyclopentanone, 2-cyan - cyclopenten-(1)-yl-amine and other organic components higher boiling than adiponitrile which comprises introducing said organic phase into a first vacuum distillation zone maintained at reduced pressures sufficient to provide a bottoms temperature of not greater than 195° C. and fractionally distilling the same to produce a first overhead fraction containing adiponitrile, cyclopentanone and 2-cyan-cyclopenten-(1)-yl-amine and a first bottoms product comprising other organic components higher boiling than adiponitrile, withdrawing said first overhead product from said first distillation zone and introducing the same into a second distillation zone maintained at reduced pressures sufficient to provide a bottoms temperature of not greater than 195° C. and fractionally distilling the same to produce a second overhead fraction containing a cyclopentanone-water azeotrope and a second bottoms product, withdrawing said second bottoms product from said second distillation zone and introducing the same into at least a third distillation zone maintained at reduced pressures sufficient to provide a bottoms temperature of not greater than 195° C. and fractionally distilling the same to produce a third overhead product containing substantially all of the 2-cyan-cyclopenten-(1)-yl-amine and withdrawing as a bottoms product adiponitrile of high purity.

References Cited

UNITED STATES PATENTS

| | | | |
|---|---|---|---|
| 2,305,103 | 12/1942 | Osgood | 260—465.8 |
| 2,748,065 | 5/1956 | Trieschmann et al | 203—77 |
| 2,841,537 | 7/1958 | Guyer et al. | 260—465.8 |
| 3,177,242 | 4/1965 | Adam et al. | 260—465.8 |
| 3,267,131 | 8/1966 | Campbell et al. | 260—465.8 |

FOREIGN PATENTS

| | | |
|---|---|---|
| 888,659 | 1/1962 | Great Britain. |
| 917,788 | 2/1963 | Great Britain. |

WILBUR L. BASCOMB, JR., *Primary Examiner.*

U.S. Cl. X.R.

23—193; 203—37, 39, 76, 77, 99; 260—465.8